United States Patent
Wendeberg et al.

(10) Patent No.: US 8,814,436 B2
(45) Date of Patent: Aug. 26, 2014

(54) TOROIDAL SPACER

(75) Inventors: Hans Wendeberg, Västra Frölunda (SE); Jonas Kullin, Ann Arbor, MI (US)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/876,384

(22) PCT Filed: May 27, 2011

(86) PCT No.: PCT/SE2011/000101
§ 371 (c)(1), (2), (4) Date: May 29, 2013

(87) PCT Pub. No.: WO2012/044222
PCT Pub. Date: Apr. 5, 2012

(65) Prior Publication Data
US 2013/0301973 A1    Nov. 14, 2013

(30) Foreign Application Priority Data
Sep. 27, 2010 (SE) .................................... 1000956

(51) Int. Cl.
*F16C 33/374* (2006.01)
*F16C 43/04* (2006.01)

(52) U.S. Cl.
USPC ......... 384/551; 384/558; 384/568; 29/898.06

(58) Field of Classification Search
USPC ........ 384/568, 551, 520, 558, 559; 29/898.06
See application file for complete search history.

(56) References Cited

U.S. PATENT DOCUMENTS

| | | | |
|---|---|---|---|
| 5,040,906 A | 8/1991 | Zornes | |
| 5,123,756 A * | 6/1992 | Amen et al. | 384/551 |
| 5,597,243 A | 1/1997 | Kaiser et al. | |
| 8,347,507 B2 * | 1/2013 | Ozu | 29/898.06 |
| 2005/0076734 A1 | 4/2005 | Miyaguchi et al. | |

FOREIGN PATENT DOCUMENTS

| | | |
|---|---|---|
| DE | 499378 C | 6/1930 |
| DE | 20111647 U1 | 10/2001 |
| EP | 0175858 A1 | 4/1986 |
| EP | 1921333 A1 | 5/2008 |
| JP | 10184693 A | 7/1998 |
| JP | 2007255536 A | 10/2007 |
| JP | 2007262718 A | 10/2007 |

* cited by examiner

*Primary Examiner* — Thomas R Hannon
(74) *Attorney, Agent, or Firm* — Bryan Peckjian; SKF USA Inc. Patent Department

(57) ABSTRACT

The present invention relates to a spacer device for roller elements in a toroidal roller bearing, and a method for manufacturing a toroidal roller bearing comprising a plurality of spacer devices. The toroidal roller bearing allows for axial and angular displacement between an inner and outer bearing ring. The spacer device provides first and second roller-contacting surfaces having a concave shape adapted to conform with respective convex contacting surfaces of the toroidal roller elements, and at least one axial end portion which is elastically deformable.

19 Claims, 7 Drawing Sheets

TOROIDAL SPACER

CROSS-REFERENCE

This application is the U.S. national stage of International Application No. PCT/SE2011/000101 filed on Sep. 27, 2011, which claims priority to Swedish Application No. SE10000956-1 filed Sep. 27, 2010, both of which are herein incorporated by reference in their entirety.

FIELD OF THE INVENTION

The present invention relates to a spacer device for roller elements in a toroidal roller bearing, and a method for manufacturing a toroidal roller bearing comprising a plurality of spacer devices, which toroidal roller bearing allows for axial and angular displacement between an inner and outer bearing ring. In its mounted position the spacer device is arranged to separate two adjacent roller elements from each other in the tangential direction in the toroidal roller bearing, such that roller-to-roller contact between the roller elements is prevented.

BACKGROUND ART

Toroidal roller bearings are known and typically used for their ability of allowing both axial and angular displacement with respect to the outer and inner ring of the toroidal roller bearing. This is enabled by the curved construction of the inner and outer rings' raceways which are adapted to conform with the curved shape of the roller elements, as described in e.g. EP 0175858. Hence, toroidal roller bearings combine self-aligning capability with unconstrained axial displacement ability.

Due to its capabilities, toroidal roller bearings provide a wide range of applicability in various bearing arrangement designs. In particular the toroidal roller bearings simplify designs comprising e.g. a long shaft that may be subject to temperature variations and bending. Furthermore, the construction of the toroidal roller bearing allows for suitable load distributions as well as low frictional running.

In order to maintain and support the roller elements in a toroidal bearing it is known to provide a cage which restricts the movements of the roller elements in relation to each other. It also has been suggested to use separate supporting elements in order to maintain the roller elements of a roller bearing in their intended relative position with respect to each other. A cage or separate spacer elements, however, restrict the number of roller elements which may be fitted in the toroidal roller bearing which will affect its load bearing capability. Also, manufacturing and assembling of the toroidal roller bearing involve cumbersome design considerations, as well as expensive tools and machinery. For example, the available design options for the bearing construction, and for different bearing arrangement designs comprising surrounding components such as axles, housing, etc., is affected. Furthermore, the assembling of prior art solutions is time-consuming and may damage the rings or rollers of the bearing.

SUMMARY OF THE INVENTION

An object of the present invention is to eliminate or at least to alleviate the above mentioned drawbacks and to provide an improved spacer device for roller elements in toroidal roller bearings, which spacer device enables more efficient separation of the roller elements while enhancing the load carrying capacity of a toroidal roller bearing. It is also an object to facilitate improved assembly of the toroidal roller bearing, in relation to prior art solutions.

These and other objects are met by the subject matter provided in the independent claims. Exemplified embodiments of the invention are presented in the dependent claims.

According to a first aspect thereof, the present invention relates to an independent spacer device for roller elements in a toroidal roller bearing having an inner and an outer ring, wherein the toroidal roller bearing allows for axial and angular displacement between the inner and outer ring. The spacer device comprises a first and second roller-contacting surface on opposite sides of the spacer device, which first and second roller-contacting surfaces are arranged to separate two adjacent toroidal roller elements in a tangential direction of the bearing. Furthermore, each of the first and second roller-contacting surfaces has a concave shape adapted to conform with respective convex contacting surfaces of the toroidal roller elements, and at least one axial end portion of the spacer device is elastically deformable, wherein the axial end portion comprises at least a portion of said first and second roller-contacting surfaces.

The present invention is based on a realization by the inventors that the shape of the outer ring raceway of the toroidal roller bearings geometrically prevent the rollers from excessive skew, i.e. rotation of the roller element's rotational axis around an axis perpendicular to the raceway. Due to the geometrical prevention of skew in toroidal roller bearings, spacer devices in a toroidal roller bearings do not need to be dimensioned with strength as a priority. Furthermore, the inventors have realized that by providing a spacer device for roller elements in toroidal roller bearings which are adapted to conform with the roller elements and which comprises elastically deformable end portions, the number of roller elements, and consequently the load bearing capabilities, may be enhanced in the toroidal roller bearing while enabling improved and efficient assembly. In other words, the spacer device is advantageous in that it allows for assembly of an increased number of roller elements which typically leave less amount of available space for intermediately arranged spacer devices. The spacer device, having tangentially larger end portions, facilitates assembly by allowing compression involving elastic deformation of at least one end portion such that a spacer device may be inserted into the restricted available space between two closely arranged roller elements. Hence, in a toroidal roller bearing comprising the spacer device, the carrying capacity of the bearing may be increased by increasing the number of rollers. For example, substantially the same carrying capacity as a full complement toroidal roller bearing, but without roller-to-roller contact, may be provided.

The spacer device is further advantageous in that it alleviates assembly and production considerations relating to damages occurring during manufacturing. For example, assembly of the spacer device into the toroidal roller bearing without damaging the rings and roller elements is provided. Also, the assembly may be performed more time efficient using less steps and by utilizing improved and more time efficient tools and machinery.

During operation in a toroidal roller bearing, the spacer device supports and separates the roller elements and thereby avoids roller-to-roller wear between the two roller elements. Instead, the contact between the contacting surfaces between the spacer device and the roller elements allow for build-up of a lubricating oil film. The oil film build-up is generated by the effective non-zero velocity in the interface between a roller-contacting surface of the spacer device and the associated contacting surface of a roller element. In other words, the effective velocity on an oil fragment between the spacer device and the roller element will not be opposite and equal, as in the case with roller-to-roller contact. Hence, the spacer device facilitates for an increased number of roller elements in the bearing which increases, or maximizes, the load bearing properties while providing efficient and durable operation due to oil film build-up.

For example, in a toroidal roller bearing, the dimensions and geometry of the spacer device may be adapted to the toroidal roller bearing and the available internal space. The space available for spacer device positioned between and separating the rollers in a toroidal roller bearing may for example be defined as a length equal to or less than the roller element axial length, a radial space equal to or less than the shape, or radial dimension, of the roller element and a tangential space equal to or smaller than the total tangential roller-to-roller play divided by the number of rollers plus the off-centered tangential space between two roller surfaces when the rollers contact each other, i.e. the space intended to accommodate the axial end portions of the spacer device. By adapting, and/or limiting, the dimensions of the spacer device, the design options of the bearing and bearing arrangements increase. Furthermore, raceway contact and/or thin and fragile section of the spacer device in the tangential direction may advantageously be avoided in embodiments of the invention.

Toroidal roller bearings accommodate axial and angular displacement by displacing the roller elements in relation to both rings. This is a specific feature of toroidal roller bearings. Furthermore, axial guidance is provided by the two adjacent rollers in a toroidal roller bearing which enables a functioning toroidal roller bearing which is equipped with spacer devices. In more detail, by providing spacer devices shaped to conform with the space defined between two adjacent rollers, guiding interaction between roller shape and spacer device shape in both the radial and the axial direction, is provided. A spacer device which is independent may be separated from other spacer devices and may further be individually inserted independent of other spacer devices.

According to an exemplifying embodiment of the present invention, the tangential distance between the first and second roller-contacting surfaces of the axial end portion is reducible by elastic deformation. By elastically reducing the tangential distance between the roller-contacting surfaces, the spacer device allows for compression and insertion of the axial end portions into a space requiring a smaller tangential dimension. Thereafter, when being arranged in its intended operational position, the spacer device may return to its original intended shape in conformity with the shape of the contacting surfaces of the adjacent roller elements.

According to an exemplifying embodiment of the present invention, a normal tangential distance between the first and second roller-contacting surface of the at least one axial end portion is compressible by elastic deformation to a compressed distance of at least 25% of the normal tangential distance, or at least 50%, or at least 70%, or at least 90%, or at least 95%.

According to an exemplifying embodiment of the present invention, the axial end portion comprises at least one recess for contributing to elastic deformability of the axial end portion. By providing a recess, or slot, for improving the elastic deformation of the spacer device, operation and assembly is further facilitated. For example, the slots, such as one, or two, or a plurality, may be provided into the axial end portions in an axial direction towards the center of the spacer device. Furthermore, the slots may extend in e.g. a radial or tangential direction in order to provide pronounced elasticity in respective direction. The recesses or slots further reduce the material and weight of the spacer device while providing axial end portions of the spacer device which are in contact with the contacting surfaces of the spacer device such that oil film build-up may occur.

According to an exemplifying embodiment of the present invention, the spacer device is formed of a uniform material which is elastically deformable, which enables efficient low cost manufacturing, for e.g. by using injection molding or similar techniques.

According to an exemplifying embodiment of the present invention, the spacer device is arranged to provide a tangential distance between the respective convex contacting surfaces of the two rollers, which tangential distance is less than the smallest distance between the first and second roller-contacting surfaces. By enabling a smaller tangential distance between the roller contacting surfaces of the roller element, the spacer device increases the number of roller elements that may be accommodated in the available space between the inner and outer ring, in the tangential direction.

According to an exemplifying embodiment of the present invention, this may e.g. be realized by providing a spacer device which is tangentially compressible by elastic deformation, such that the compressed tangential distance is less than the smallest uncompressed distance between the complete first and second roller-contacting surfaces.

According to an exemplifying embodiment of the present invention, a smaller tangential distance between the contacting surfaces of the two adjacent roller elements is realized by providing a spacer device which comprises a center opening, which center opening extends through the spacer device from the first roller-contacting surface to the second roller-contacting surface. In particular, to maximize the carrying capacity of a toroidal roller bearing it is interesting to minimize the tangential roller-to-roller distance or roller-to-roller play. Advantageously, this is achieved without consequential thin sections in the spacer devices by providing the center openings, or holes, in the center of the elements. For example, with relevant spacer device thickness and relevant ellipse geometry of the opening cross-section, typically extending in the axial direction, it is possible to make "near zero" tangential roller-to-roller play without roller-to-roller contact. The opening may e.g. be formed in center regions of the spacer device and may be adapted to conform with the contacting surface and geometry of the roller elements, which center region constitutes the section of the spacer device which is thinnest in the tangential direction. Also, the contacting surfaces of the adjacent roller elements will extend into the openings in the tangential direction such that the effective tangential distance between the roller elements is reduced, or minimized.

According to an exemplifying embodiment of the present invention, the spacer device is arranged to absorb tangential, and/or axial displacements between the two roller elements by elastic deformation. This is advantageous during assembly of spacer devices into a toroidal roller bearing and for retention of spacer devices in a toroidal roller bearing. In particular, with an increased number of rollers, manufacturing and assembly becomes demanding from a spacer device precision point of view since the aggregated tangential space is minimized. Such precision demands increases the spacer device production cost and also the assembly may advantageously be avoided by allowing absorption, making the spacer device act like tangential springs. Also, the spacer devices may be manufactured with lower precision demand, and relieved tolerance requirements.

According to an exemplifying embodiment of the present invention, the spacer device is retained in an intermediate position between the two roller elements by interaction between said concave surfaces of the first and second roller-contacting surfaces and the convex surfaces of the two roller elements. This reduces the need for additional spacer device support structures intended to maintain the spacer device in a correct position. Instead, the location and position of the spacer device between the adjacent roller elements is self-correcting due to the surface interactions and geometry of the respective roller-contacting surfaces. In particular, the tangentially wider axial end portions of the spacer device efficiently prevent the spacer device from axially moving or sliding out from its intended intermediate position since the end portions do not fit through the relatively smaller distance, or center space, between the roller elements.

According to an exemplifying embodiment of the present invention, it relates to a toroidal roller bearing which allows for axial and angular displacement, which toroidal roller bearing comprises a plurality of spacer devices. Advantageously the number of roller elements, and therefore the load bearing capacity of the toroidal roller bearing, may be increased, while avoiding roller-to-roller contact.

According to an exemplifying embodiment of the invention, the toroidal roller bearing comprising a plurality of spacer devices is a sealed toroidal roller bearing. The open areas on the two axial end faces of the bearing between the inner and the outer ring present seals for preventing dust, dirt etc. from entering the bearing. The seals can also retain lubricant, such as oil or grease, in the bearing. The seals may for instance be made of a polymer or a metal. The invention leads to that there will be more space available for the seals compared to a toroidal roller bearing having a cage.

According to a second aspect thereof, the present invention relates to a method for manufacturing a toroidal roller bearing having a plurality of roller elements arranged between respective raceways of an inner and an outer ring, wherein the toroidal roller bearing allows for axial and angular displacement between the inner and outer ring. Furthermore, the toroidal roller bearing further comprises a plurality of spacer devices each having a first and second roller-contacting surface on opposite sides, which first and second roller-contacting surfaces being arranged to separate two adjacent roller elements in a tangential direction of the bearing. The method comprises mounting the plurality of roller elements and said plurality of spacer devices by insertion between the inner and outer ring, which insertion comprises compressing at least one axial end portion of at least one spacer device between the two adjacent roller elements. Accordingly, compression of the axial end portion allows an increased number of roller elements and spacer devices to be assembled and accommodated in the available space between the inner and outer ring of the toroidal roller bearing. For example, by compressing the axial end portion of the spacer device, the axial end portion allows for assembling of the spacer device by pressing the axial end portion through a space having a cross-sectional dimension which is less than corresponding cross-sectional dimension of the axial end of the spacer device. Hence, an increased number of roller elements with less intermediate tangential distance may be provided in the toroidal roller bearing while allowing for insertion of spacer devices for tangential separation of the roller elements.

According to an exemplifying embodiment of the method, the at least one axial end portion is elastically deformable and comprises at least a portion of each the first and second roller-contacting surfaces. By providing an elastically deformable axial end portion of the spacer device, its tangential width in the axial end portion may be reduced, which enables it to be inserted and arranged in correct position between adjacent roller elements.

According to an exemplifying embodiment of the method, the at least one axial end portion is compressed in a tangential direction when at least one roller element is inserted into position between two spacer devices. Hence, when e.g. finalizing the assembly of a toroidal roller bearing by inserting a final roller element in the remaining available space between two mounted spacer devices, the axial ends of the spacer devices on the insertion side of the bearing may reduce their tangential width by elastic deformation in order to allow for insertion of the convex shaped roller elements. In more detail, the center section of the roller elements, having an increased tangential width, may be moved, or pressed, through the available space defined between the axial end portions of the spacer devices by compressing the axial ends of the spacer devices, after which the axial ends may return to their normal, tangentially wider, shape.

According to an exemplifying embodiment of the method, the at least one axial end portion is compressed in a tangential direction when the at least one spacer device is inserted into position between two roller elements. Hence, in a similar manner as described above, when e.g. finalizing the assembling by inserting a final spacer device in the remaining available space between two adjacent roller elements, the tangential width of the axial end portion of the spacer device may be compressed while moving, or pressing, the spacer device passed the tangentially wider center sections of the convex shaped adjacent roller elements. Thereafter, when arranged in its intended intermediate position, the axial end portion advantageously recover its normal uncompressed shape, wherein the roller-contacting surfaces in the axial end portion will conform with, or remain in contact with, the contacting surfaces of the axial ends of the roller elements.

For example, a toroidal roller bearing may comprise curved roller elements separated in a tangential direction by a plurality of spacer devices according to the present invention. In addition, the toroidal roller bearing comprises an inner and an outer ring having raceways with curved profiles which substantially conform with longitudinal curved profiles of roller elements, wherein the curved profiles have a substantially larger radius of curvature in relation to the distance between a center axis of the toroidal roller bearing and the inner ring raceway. For example, the ratio between the radius of the curved profiles and the distance between the center axis of the toroidal roller bearing is at least more than 2, or 10, or 20.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other objectives, features and advantages of the present invention will appear from the following detailed disclosure, from the attached dependent claims as well as from the drawings.

BRIEF DESCRIPTION OF DRAWINGS

Exemplifying embodiments of the present invention will now be described in more detail, with reference to the accompanying drawings, wherein.

Figure 1:
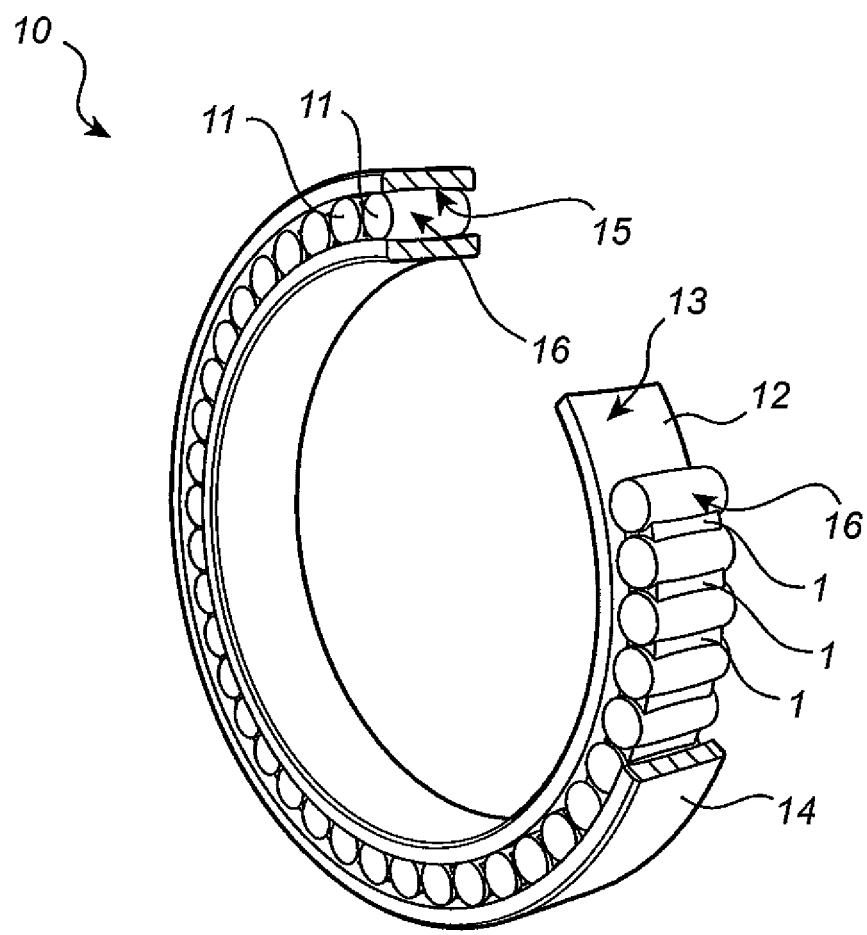
FIG. 1 is a schematic perspective view of a toroidal roller bearing with spacer devices according to an embodiment of the invention.

It is noted that the drawings are not true to scale, and, as is readily appreciated by a person skilled in the art, dimensions other than those illustrated in the drawings are equally possible within the scope of the invention. It is also to be noted that some details in the drawings may be exaggerated in comparison with other details.

DETAILED DESCRIPTION OF EMBODIMENTS OF THE INVENTION

With reference to FIG. 1, it shows a schematic perspective view of a toroidal roller bearing 10 arranged with a plurality of spacer devices 1 according to the present invention. The toroidal roller bearing 10, in the following also referred to as the bearing 10, comprises a plurality of roller elements 11 having a convex shape with a curved longitudinal cross-section and contacting surfaces 16. The bearing 10 further comprises an inner ring 12 arranged with an inner raceway 13 and an outer ring 14 having an outer raceway 15, wherein the roller elements 11 are consecutively arranged between the inner and outer rings 12, 14 such that roller contacting surfaces 16 are in contact with the inner and outer raceways 13, 15. As illustrated, the raceways 13, 15 have curved cross-sections which are adapted to conform with the curved longitudinal cross-sections of the roller elements 11, wherein the profile of the curving has a substantially larger radius of curvature in relation to the distance between the center axis of the bearing 10 and the inner ring raceway 13. In bearing 10, each spacer device 1 is arranged in an intermediate position between two roller elements 11 and thereby separates the adjacent roller elements in the tangential direction such that roller-to-roller contact between the roller elements 11 is prevented. Furthermore, each spacer device 1 is maintained in its intermediate and center position in relation to the roller elements in the axial and radial direction, wherein each spacer device 1 is separate and is independently arranged between the adjacent roller elements 11. Additional support features for retaining the spacer device 1 in the intended position are typically not required. The available space for accommodation of the spacer device 1 in the bearing 10 is e.g. limited by, or defined by, the axial and radial extension of the roller elements 11, wherein the spacer device 1 is adapted to avoid contact with the inner or outer raceways 13, 15. Moreover, the spacer device 1 does not extend further than, or beyond, the roller elements 11 in a axial direction. In other words, the spacer device 1 has a radial extension less than, or equal to, the radial extension of the roller elements, and an axial extension less than, or equal to, the axial extension of the roller elements 11. Furthermore, the spacer device 1 comprises roller-contacting surfaces which are adapted to conform with the contacting surfaces 16 of the roller elements 11.

A characteristic feature of the toroidal roller bearing is the capability of axial and angular, i.e. self-aligning, displacement between the inner and outer rings 12, 14. In particular, this is facilitated by the substantially larger radius of curvature of the curved cross-sections of the roller elements 11 and the inner and outer raceways 13, 15. A relative large radius of curvature provides a low curvature in relation to the radial extension of the bearing which allows for decreased friction during gliding contact between the contact surface 16 of the roller elements 11 and the raceways 13, 15.

Figures 2A, 2B:
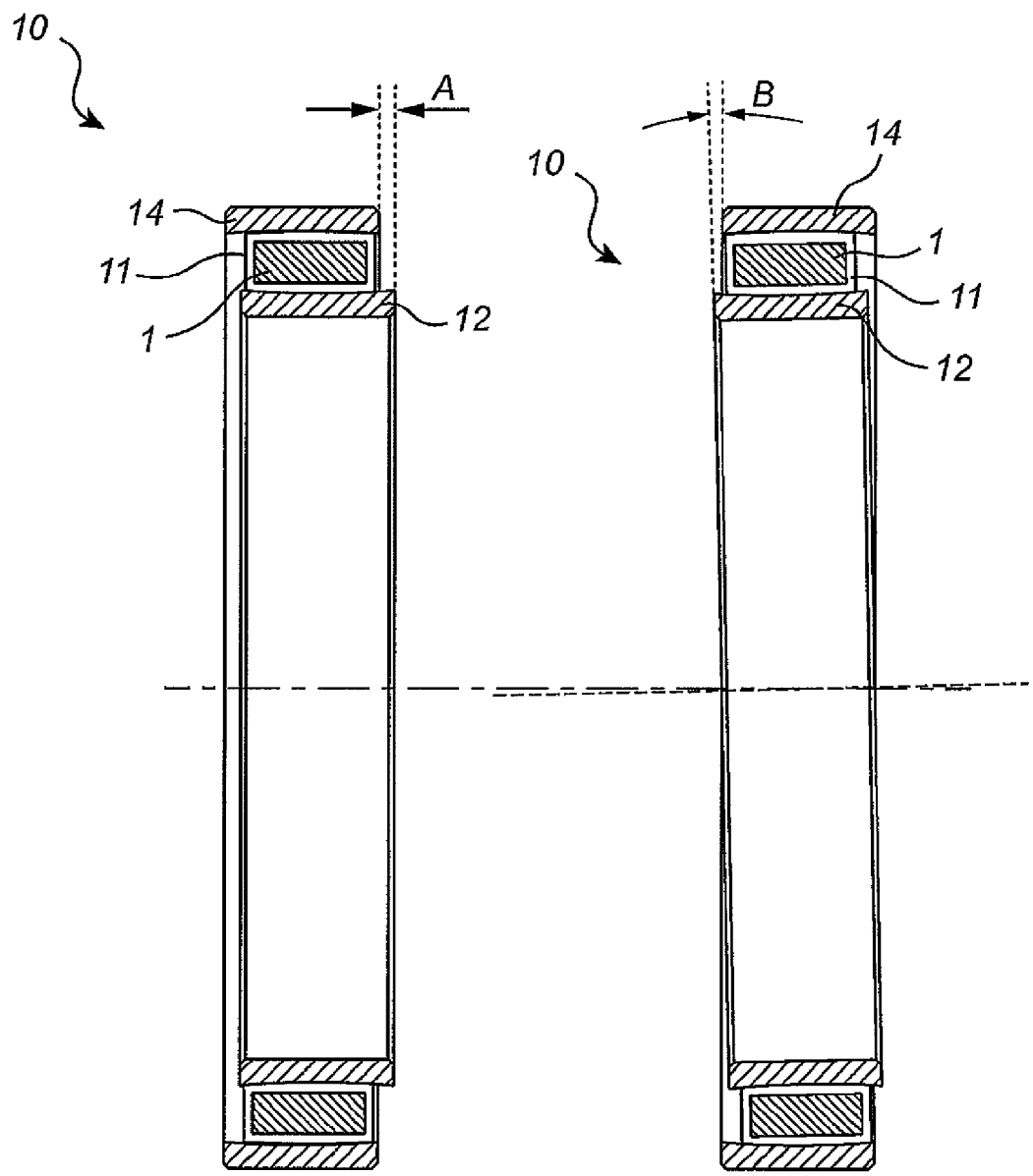
FIG. 2a is a cross-sectional view of a toroidal roller bearing with spacer devices according to an embodiment of the invention, wherein said toroidal roller bearing experience axial displacement.
FIG. 2b is a cross-sectional view of a toroidal roller bearing with spacer devices according to an embodiment of the invention, wherein said toroidal roller bearing experience angular displacement.

In FIG. 2a, a cross-sectional view of the toroidal roller bearing 10 with spacer devices 1, is illustrated, wherein the inner ring 12 is axially displaced a distance A in relation to the outer ring 14.

With reference to FIG. 2b, the inner ring 12 is angularly displaced, with an angle B, in relation to the outer ring 14. As illustrated, the spacer device 1 is retained between the adjacent roller elements in a center position in relation to the roller elements. Moreover, the spacer device 1 does not extend outside the roller elements, neither in the radial nor in the axial direction.

With reference to FIGS. 3a-d, some example embodiments of the spacer device 1 are illustrated. It is noted that some details, features and dimensions of the spacer device 1, such as the tangential thickness and the convex curvature, are exaggerated in order to more clearly indicate these details and features. On tangentially opposite sides, the spacer device 1 comprises a first and a second roller-contacting surface 2 and 3, which are arranged to separate two adjacent roller elements in a tangential direction when mounted in correct position in the bearing. The spacer device 1 has a general concave shape, wherein each of the roller-contacting surfaces 2, 3 have a curved concave shape adapted to conform with the convex shape of the bearing roller elements. Furthermore, at least one axial end portion 4, is further arranged to enable elastic deformation, such that a portions of each one of the roller-contacting surfaces may be compressed towards each other after which the end portion 4 of the spacer device 1 recovers, or automatically returns to, its initial, or normal, tangential dimension.

During operation in a toroidal roller bearing, the roller-contacting surfaces 2,3 of the spacer device 1 are by definition in constant, at least partial, contact with the rotating roller elements 11. To minimize friction and wear, the material, the immediate contact areas and the surface topography may e.g. be chosen to provide a separating oil film. For example, different types of polymer materials, such PA or PEEK, with or without filling and/or reinforcing fibers, are suitable materials for the spacer device 1. In general, any material that is elastically deformable may be suitable for the spacer device 1. Furthermore, the spacer device 1, in particular the roller-contacting surfaces 2,3, may be provided with shapes and texture that are advantageous for film-building. For example, roller-contacting surfaces provided with many shallow and/or non-connected recesses with sloping connection between bottom and edge are advantageous in a lubrication and a local film-building perspective.

Figure 3A:
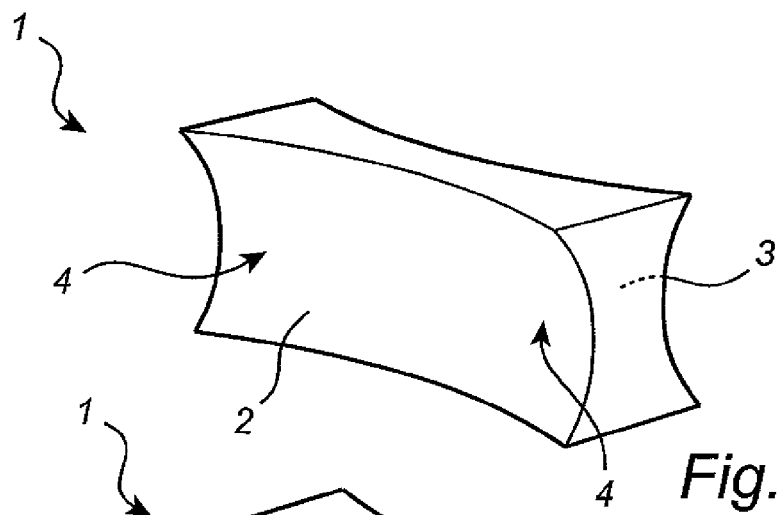
FIGS. 3a-d are schematic perspective views of embodiments of the spacer device according to the present invention.
Figure 3B:
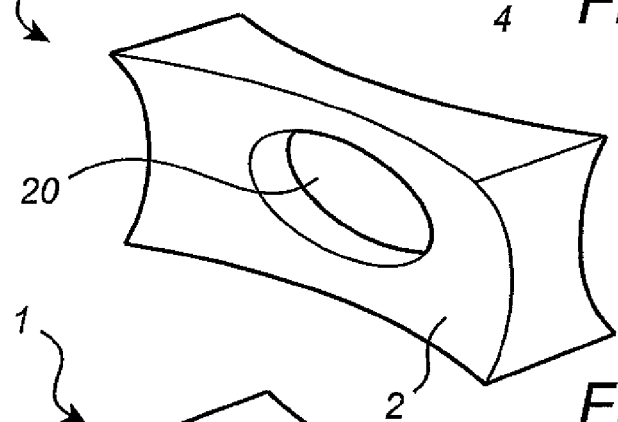

In FIG. 3b, the spacer device is further provided with an opening 20, or hole, which extends tangentially from the first roller-contacting surface 2 to the second roller contacting surface 3. The opening 20 is provided in the center of the spacer device 1, in a location where the tangential distance between the first and second roller-contacting surfaces 2, 3 is smallest. Hence, the thinnest portion of the spacer device comprising the first and second roller-contacting surfaces 2, 3 is removed. In particular, the opening 20 allows for that the roller elements may be arranged with minimized tangential distance between each other, wherein portions of the contacting surface of the roller element will extend into the opening 20 during operation. For example, substantially zero tangential distance between the contacting surfaces 16 at the tangentially widest sections of the roller elements 11 may be provided. The tangential distance may at least be substantially reduced.

Furthermore, the durability and stability of the spacer device will be improved since, by providing the opening 20, the thinnest and most fragile portion of the spacer device is removed. The opening is further adapted to the curved shape of the roller elements by being provided with an elliptical shape mainly extending in the axial direction. Although an opening in the form of a through-hole has been illustrated, an alternative would be to provide depressions in one or both roller-contacting surfaces.

Figure 3C:
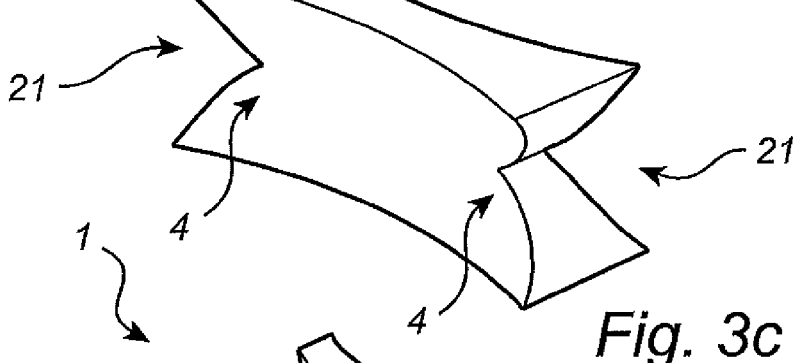
Figure 3D:
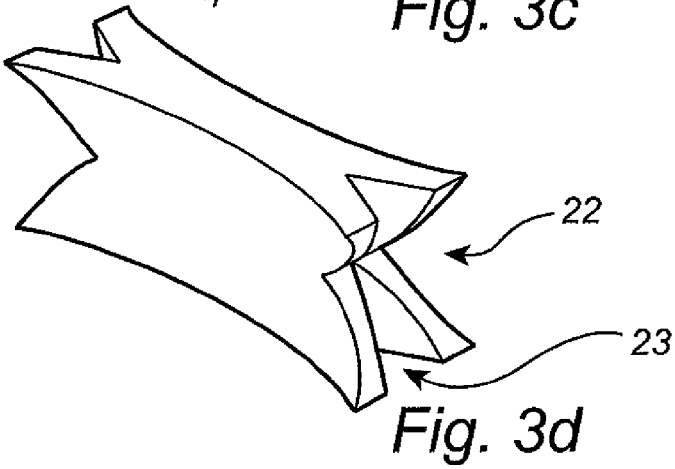

In FIG. 3c, the spacer device 1 is further provided with axial end recesses, or slots, 21 for contributing to the elastic deformability of the axial end portions 4. For example by reducing the amount of material, the spacer device may be inserted in the right position using less force which e.g. reduces the risk for manufacturing damage. The recesses 21 forms voids in the axial end portions of the spacer device 1 and extend into the spacer device 1. As further illustrated in FIG. 3d, the spacer device 1 may be provided with tangential recesses 22 and radial recesses 23 which extend in the tangential and radial direction, respectively. However, the direction of the recesses are not limited to these particular directions, and may further be formed on one or both roller-contacting surfaces of the axial end portions 4.

Figure 4A:
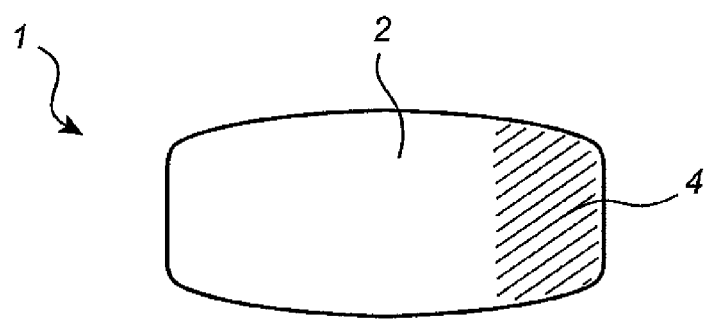
FIGS. 4a-b are side views of embodiments of the spacer device.
Figure 4B:
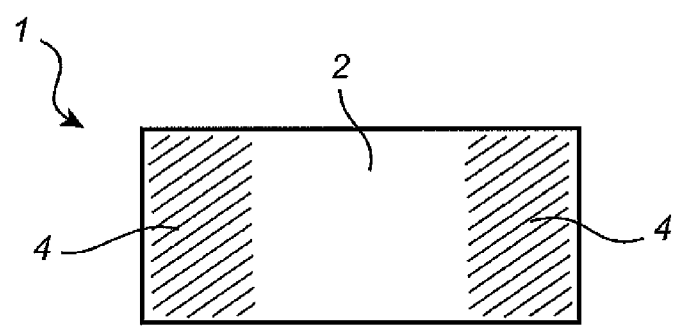

FIGS. 4a-4b are side views of embodiments of the spacer device 1, which schematically illustrate a roller-contacting surface 2 having elastically deformable end portions 4.

With reference to FIG. 4a, the cross-sectional shape of the spacer device 1, in a tangential projection, is curved, such that the raceway facing surfaces of the spacer device 1 may conform with the cross-sectional curvature of the respective raceways. The spacer device 1 comprises one exemplifying axial end portion 4a which is elastically deformable, wherein the characterizing elastic portions is shaded. As illustrated, the elastic feature of the axial end portion 4a extends axially towards the center of the spacer device 1, and thereby also comprises a portion of the roller-contacting surface 2.

With reference to FIG. 4b, the cross-sectional shape of the spacer device 1, in a tangential projection, is substantially rectangular. Furthermore, both axial end portions 4a, 4b of the spacer device are elastically deformable, as indicated by the opposite shaded portions of the spacer device 1.

In an exemplifying embodiments, the shaded portions, indicating elastically deformable portions, of the spacer device are more, or substantially more, elastically deformable than the non-shaded portions of the spacer device 1. For example, the axial end portion, or portions, of the spacer device may allow for increased elastic deformation of at least 3%, or 5%, or 10%, or 20%, or 30%, or 40%, or 50% in relation to the remaining portions of the spacer device 1. Varying elastic deformability in the spacer device 1 may be provided by using different materials for different portions of the spacer device, or by providing portions of the spacer device with elastic enhancing or elastic reducing means or features, such as recesses, holes, or more firm and solid members which may be integrated with the spacer device 1.

Figure 5:
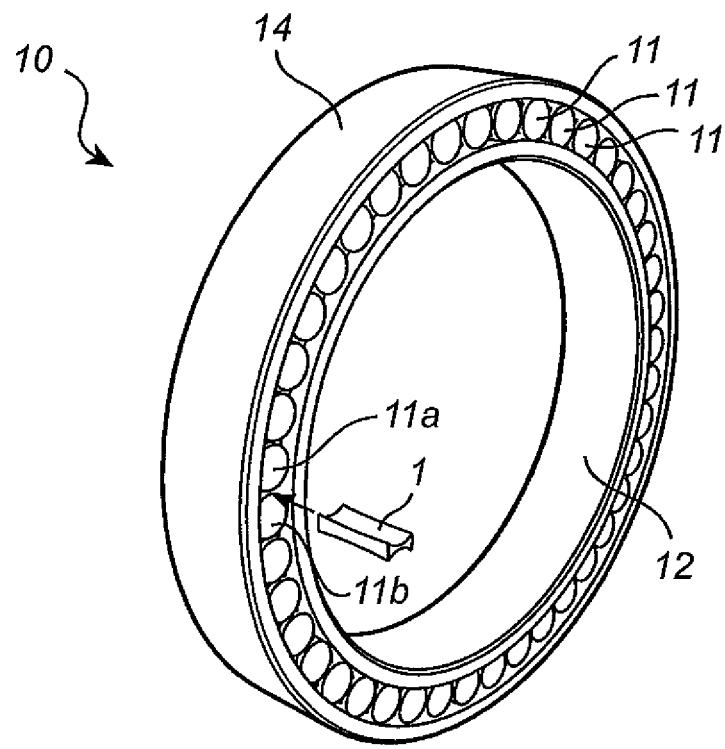
FIG. 5 is a schematic view of a toroidal roller bearing during assembly. according to an embodiment.

FIG. 5 is a schematic view of a toroidal roller bearing during assembly of the spacer device 1 according to an embodiment of the invention. The assembly method relates to the manufacturing of a toroidal roller bearing 10 having a plurality of roller elements 11 and a plurality of spacer devices, wherein the method comprises mounting the plurality of roller elements 11 and said plurality of spacer devices by insertion between the inner and outer rings. As illustrated, in a final assembly step, the method comprises inserting the final spacer device 1 between the available space provided between the two adjacent mounted roller elements 11a and 11b. Due to the shape of the roller elements 11 and the maximized number of roller elements 11 being mounted in the bearing 10, the available space for insertion of the final spacer device 1 is restricted. However, the insertion of the final spacer device 1 is realized by compressing the inserted axial end portion of the spacer device 1 between the adjacent roller elements 11a, 11b, such that the inserted axial end portion of the spacer device 1 may be inserted and moved through the restricted available space into its correctly assembled position between the roller elements 11a, 11b. In more detail, one of the axial ends of the spacer device, referred to as the inserted end, is inserted between the contacting surfaces of the adjacent roller elements, such that the roll-contacting surfaces of the inserted end of the spacer device are in gliding contact with the contacting surfaces of the roller elements, wherein the inserted end becomes compressed and deform elastically while being moved axially into position by means of an axial force exerted on the spacer device 1.

The assembling of the roller elements and spacer devices may further comprise tilting the inner and outer rings 12, 14 in relation to each other.

Figure 6:
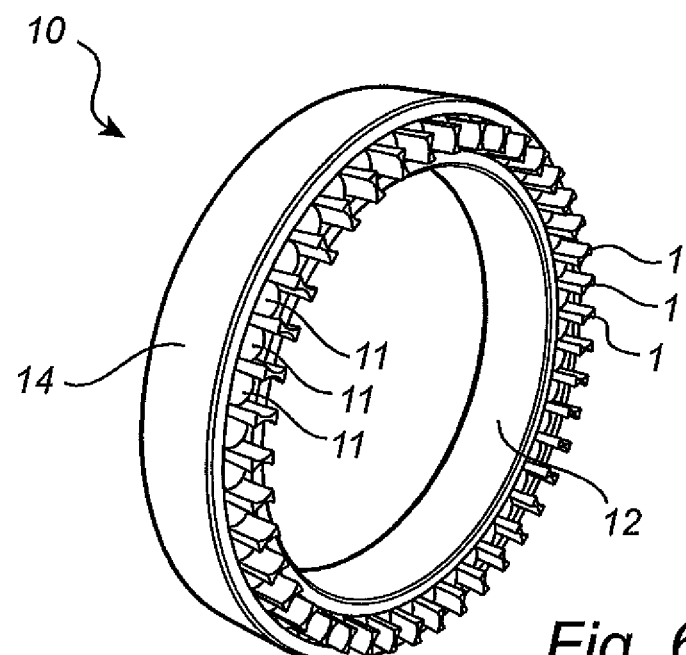
FIG. 6 is a further schematic view of a toroidal roller bearing during assembly according to an embodiment.

In FIG. 6 a further schematic view of toroidal roller bearing 10 during assembly according to an embodiment, is illustrated. According to the method, a plurality of roller elements 11 are inserted between the inner and outer rings 12, 14, wherein a plurality of spacer devices 1 are inserted into respective intermediate positions between the roller elements 11. As illustrated, the assembly comprises inserting the plurality of spacer devices 11 simultaneously, wherein the inserted axial end of each spacer device 1 is compressed between respective adjacent roller elements 11. Hence, in a first step during assembly, the intended number of roller elements 11 are arranged in their intended position between the inner and outer rings 12, 14 of the bearing 10. Thereafter, the plurality of the spacer devices 1 are inserted wherein the inserted axial end of each one of the spacer devices are compressed between the adjacent roller elements. Hence, the spacer devices 1 may advantageously be inserted and assembled in a single insertion step which allows for time efficient assembling.

Figure 7A:
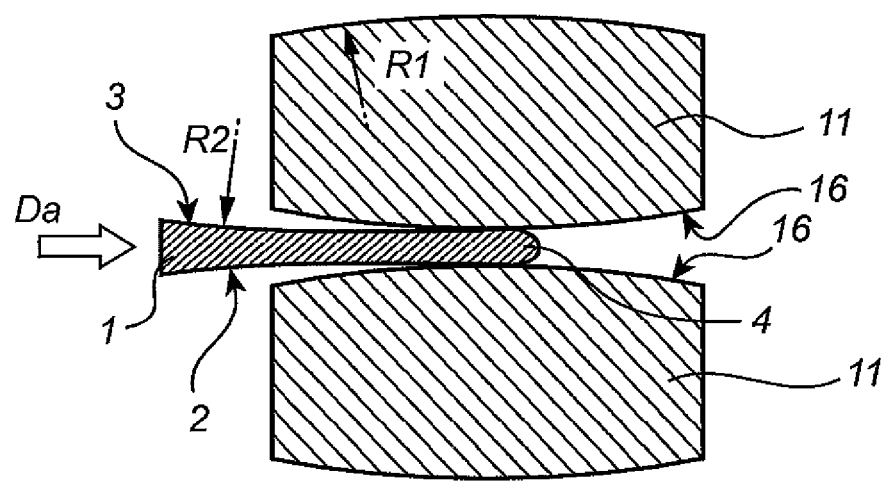
FIGS. 7a-b are schematic cross-sectional views of the spacer device and adjacent roller elements according to an embodiment of the invention.
Figure 7B:
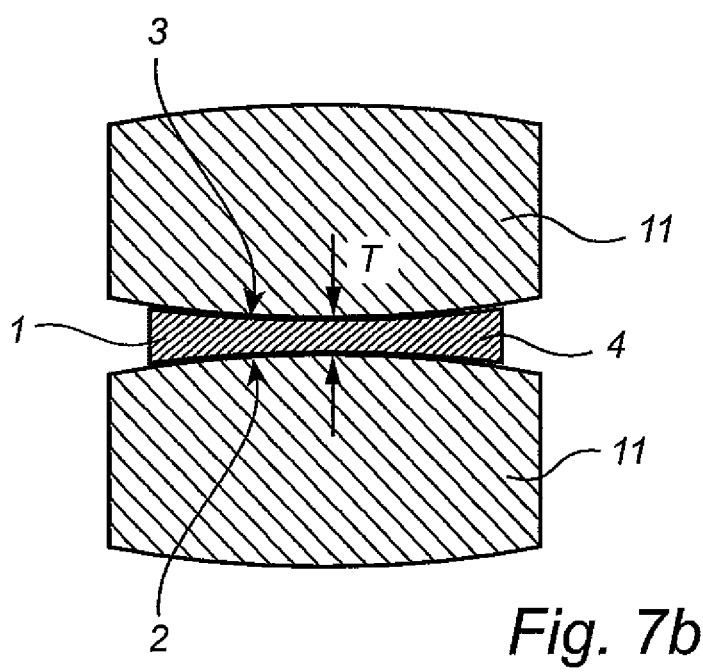

With reference to FIGS. 7a-b, the spacer device 1 and two adjacent roller elements 11 are schematically illustrated in a cross-sectional view.

In FIG. 7a, the spacer device 1 is shown during assembling wherein the inserted axial end 4 is elastically compressed between the roller elements 11. In more detail, the roller-contacting surfaces 2, 3 of the spacer device 1 is gliding against and is being compressed towards each other by the contacting surfaces 16 of the roller elements 11. In particular, the tangential distance between the contacting surfaces 16 of the roller elements 11 is less than the tangential dimension of the inserted axial end 4 of the spacer device 1. The spacer device 1 is by force introduced between the roller elements 11, which force is applied to the spacer device in a axial direction Da. As further illustrated, the radius of the roller curvature R1 of the contacting surfaces 16 of the roller elements, and the radius of the spacer curvature R2 of the roller-contacting surfaces are arranged to be substantially equal, or within a difference of 5%, or 10%, or 20% in relation to each other.

With reference to FIG. 7b, the spacer device 1 has been fully inserted into its intended position between the roller elements 11. In this position, the two adjacent roller elements 11 are tangentially separated a minimized distance T, which distance T is exaggerated for illustrative purposes. The separation is provided by the spacer device, wherein the axial end portions of the spacer device retains the spacer device in its intended position by limiting axial movement of the spacer device in relation to the roller elements 11. However, since the axial end portions of the spacer device 1 do not need to support or carry tangential loads from the roller elements which are geometrically prevented from excessive skew, the axial end portions of the spacer device may be elastically deformable. As further illustrated in FIG. 7b, the, during insertion, compressed axial end portion returns to its intended shape such that the roller-contacting surfaces of the axial end portion of the spacer device 1 conforms with, or contacts, the contacting surface 16 of the roller elements. According to an exemplifying embodiment, the spacer device 1 is tangentially compressible such that, during a compressed state, the tangential distance T between the roller elements 11 is less than the smallest uncompressed distance between the roller-contacting surfaces 2, 3. For example, the spacer device 1 which is elastically deformable may be provided by forming the spacer device 1 of a uniform elastic material.

Figure 8:
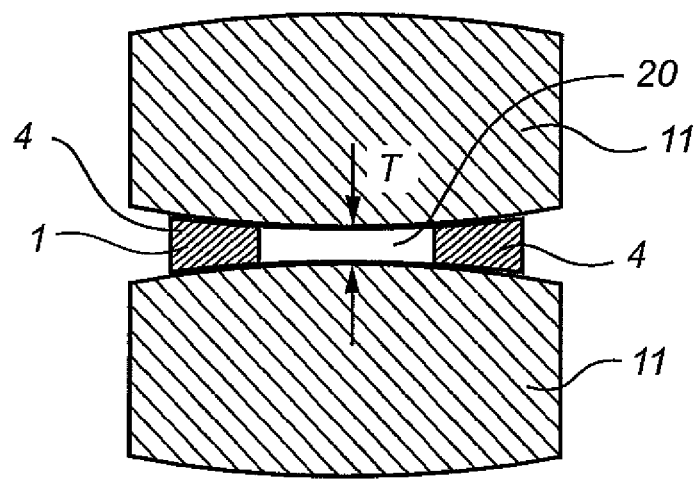
FIG. 8 is a schematic cross-sectional view of the spacer device and adjacent roller elements according to an embodiment of the invention.

In FIG. 8, a schematic cross-sectional view of a spacer device 1 comprising an opening 20 as described with reference to FIG. 3b, is illustrated. The spacer device 1 is arranged in a mounted position between two adjacent roller elements 11, wherein the center opening 20 in the spacer device 1 allows for the contacting surfaces 16 of the roller elements 11 to extend into the opening, such that the tangential distance T between the roller elements 11, is reduced. By varying the opening and adapting it to the longitudinal curvature of the roller elements 11, a near zero tangential distance T may be realized. As illustrated, the tangential distance T between the respective convex contacting surfaces of the roller elements 11 is less than the smallest distance between the first and second roller-contacting surfaces 2, 3 of the spacer device.

Figure 9:
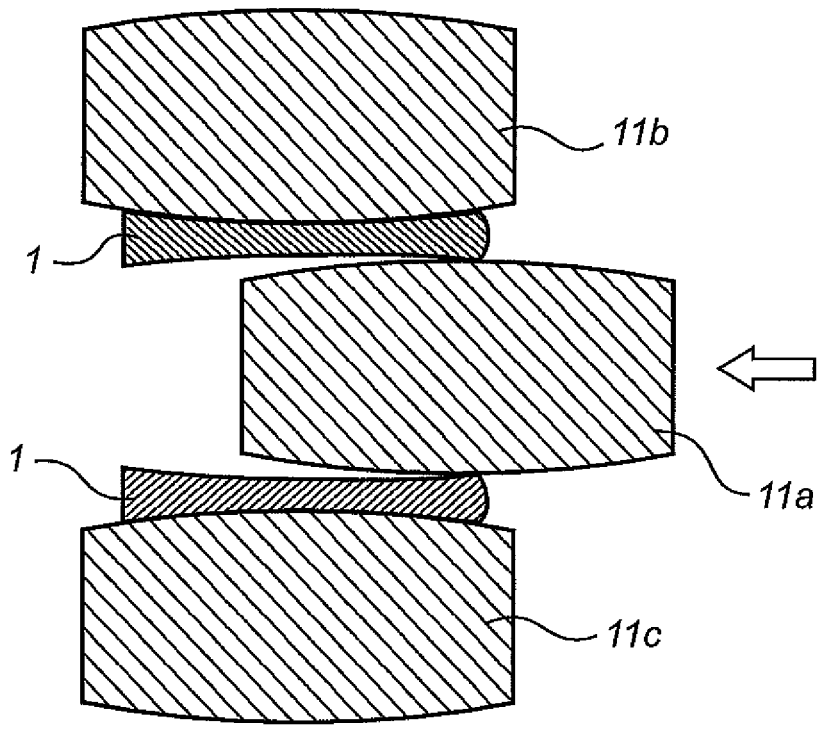
FIG. 9 is a schematic cross-sectional view of spacer devices and adjacent roller elements according to an embodiment of the invention.

FIG. 9 is a schematic cross-sectional view of spacer devices and adjacent roller elements according to an embodiment of the invention during assembling of a toroidal roller bearing. A final roller element 11a is inserted in position between the inner and outer rings (not shown) and between the spacer devices 1 and the roller elements 11b and 11c. As illustrated, axial end portions of the spacer devices 1 are compressed in a tangential direction when the roller element 11a is inserted into position.

The invention has mainly been described above with reference to a few exemplifying embodiments. However, as is readily appreciated by a person skilled in the art, other embodiments than the ones disclosed above are equally possible within the scope of the invention, as defined by the appended patent claims.

The invention claimed is:

1. A spacer device for roller elements in a toroidal roller bearing having an inner and an outer ring, wherein the toroidal roller bearing allows for axial and angular displacement between the inner and outer ring, the spacer device comprising:
    a first and second roller-contacting surface on opposite sides of the spacer device, wherein
    the first and second roller-contacting surfaces are arranged to separate two adjacent toroidal roller elements in a tangential direction of the bearing, wherein
    each of the first and second roller-contacting surfaces has a concave shape adapted to conform with respective convex contacting surfaces of the toroidal roller elements, and wherein
    at least one axial end portion of the spacer device is elastically deformable, the axial end portion including at least a portion of the first and second roller-contacting surfaces.

2. The spacer device according to claim 1, wherein the tangential distance between the first and second roller-contacting surfaces of the axial end portion is reducible by elastic deformation.

3. The spacer device according to claim 1, wherein a normal tangential distance between the first and second roller-contacting surface of the at least one axial end portion is compressible by elastic deformation to a compressed distance of at least 25% of the normal tangential distance.

4. The spacer device according to claim 1, wherein the axial end portion provides at least one recess for contributing to elastic deformability of the axial end portion.

5. The spacer device according to claim 1, wherein the spacer device is formed of a uniform material which is elastically deformable.

6. The spacer device according to claim 1, wherein the spacer device is arranged to provide a tangential distance between the respective convex contacting surfaces of the two rollers, wherein
    the tangential distance is less than a smaller one of the distance between the first and second roller-contacting surfaces.

7. The spacer device according to claim 6, wherein the spacer device is tangentially compressible, and wherein the tangential distance is less than the smallest uncompressed distance between the first and second roller-contacting surfaces.

8. The spacer device according to claim 1, wherein the spacer device provides a center opening for reducing the distance between the two roller elements, wherein the center opening extends through the spacer device from the first roller-contacting surface to the second roller-contacting surface.

9. The spacer device according to claim 1, wherein the spacer device is arranged to absorb tangential, and/or axial displacements between the two roller elements by elastic deformation.

10. The spacer device according to claim 1, wherein the spacer device is retained in an intermediate position between the two roller elements by interaction between the concave surfaces of the first and second roller-contacting surfaces and the convex surfaces of the two roller elements.

11. The spacer device according to claim 1, wherein a normal tangential distance between the first and second roller-contacting surface of the at least one axial end portion is compressible by elastic deformation to a compressed distance of at least 50% of the normal tangential distance.

12. The spacer device according to claim 1, wherein a normal tangential distance between the first and second roller-contacting surface of the at least one axial end portion is compressible by elastic deformation to a compressed distance of at least 70% of the normal tangential distance.

13. The spacer device according to claim 12, wherein a normal tangential distance between the first and second roller-contacting surface of the at least one axial end portion is compressible by elastic deformation to a compressed distance of at least 95% of the normal tangential distance.

14. The spacer device according to claim 1, wherein a normal tangential distance between the first and second roller-contacting surface of the at least one axial end portion is compressible by elastic deformation to a compressed distance of at least 90% of the normal tangential distance.

15. A toroidal roller bearing which allows for axial and angular displacement, the toroidal roller bearing having a plurality of spacer devices comprising:
  a first and second roller-contacting surface on opposite sides of the spacer device, wherein
  the first and second roller-contacting surfaces are arranged to separate two adjacent toroidal roller elements in a tangential direction of the bearing, wherein
  each of the first and second roller-contacting surfaces has a concave shape adapted to conform with respective convex contacting surfaces of the toroidal roller elements, and wherein
  at least one axial end portion of the spacer device is elastically deformable, the axial end portion comprising at least a portion of the first and second roller-contacting surfaces.

16. A method for manufacturing a toroidal roller bearing having a plurality of roller elements arranged between respective raceways of an inner and an outer ring, wherein the toroidal roller bearing allows for axial and angular displacement between the inner and outer ring,
  the toroidal roller bearing further comprising a plurality of spacer devices each having a first and second roller-contacting surface on opposite sides, which first and second roller-contacting surfaces being arranged to separate two adjacent roller elements in a tangential direction of said bearing, the method comprising,
  mounting the plurality of roller elements and the plurality of spacer devices by insertion between the inner and outer ring, which insertion comprises compressing at least one axial end portion of at least one spacer device between the two adjacent roller elements.

17. The method according to claim 16, wherein the at least one axial end portion is elastically deformable and comprises at least a portion of the first and second roller-contacting surfaces.

18. The method according to claim 16, wherein the at least one axial end portion is compressed in a tangential direction when at least one roller element is inserted into position between two spacer devices.

19. The method according to claim 16, wherein the at least one axial end portion is compressed in a tangential direction when the at least one spacer device is inserted into position between two roller elements.

* * * * *